Nov. 25, 1941.    W. P. SMITH ET AL    2,264,222
MEANS FOR MOLDING
Filed April 4, 1941    3 Sheets-Sheet 1
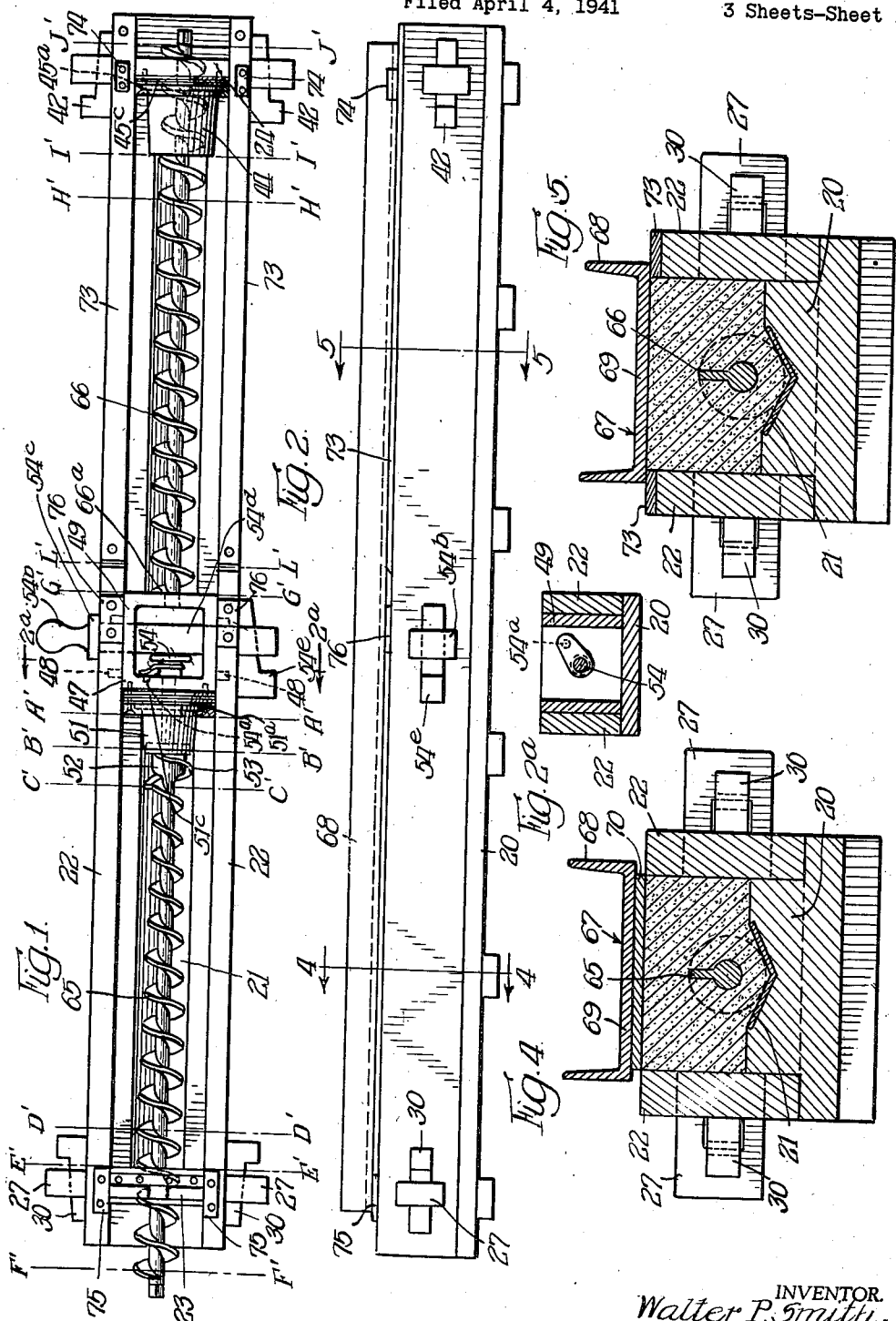
INVENTOR.
Walter P. Smith,
C Edward Westover,
BY Nov. 25, 1941.   W. P. SMITH ET AL   2,264,222
MEANS FOR MOLDING
Filed April 4, 1941   3 Sheets-Sheet 2
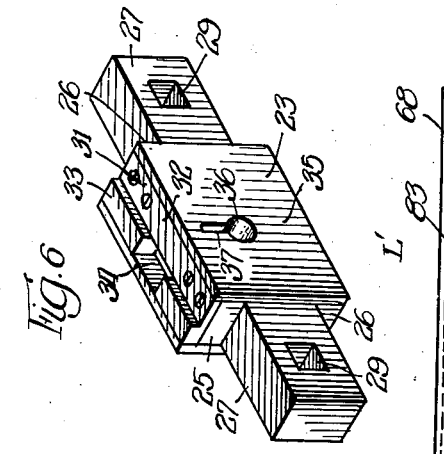
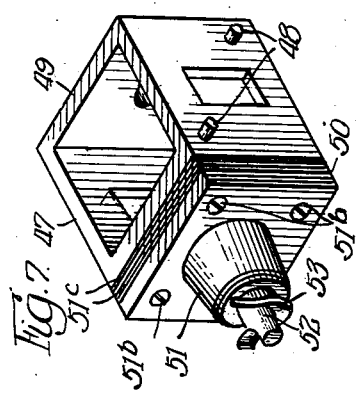
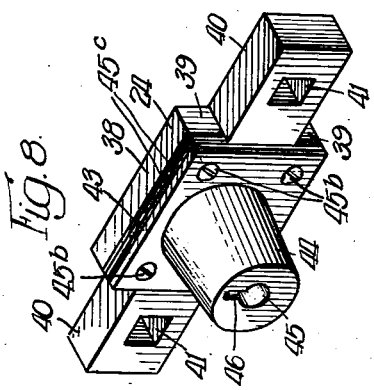
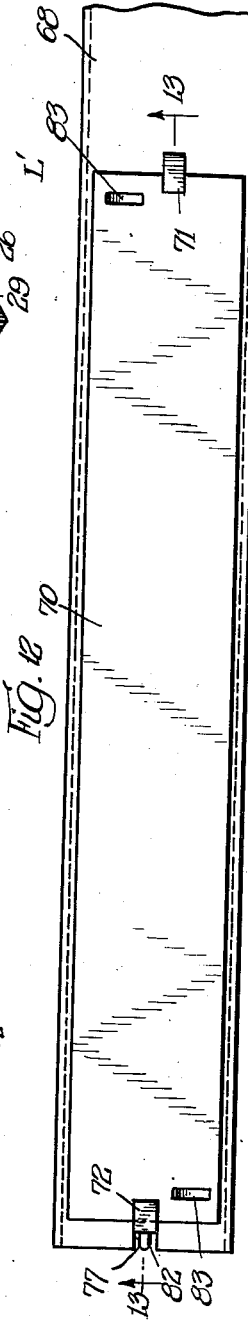
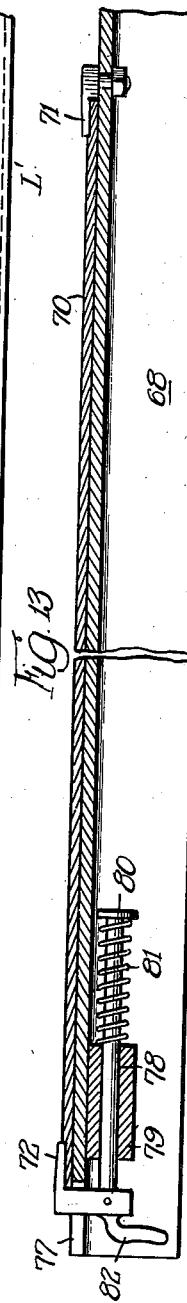
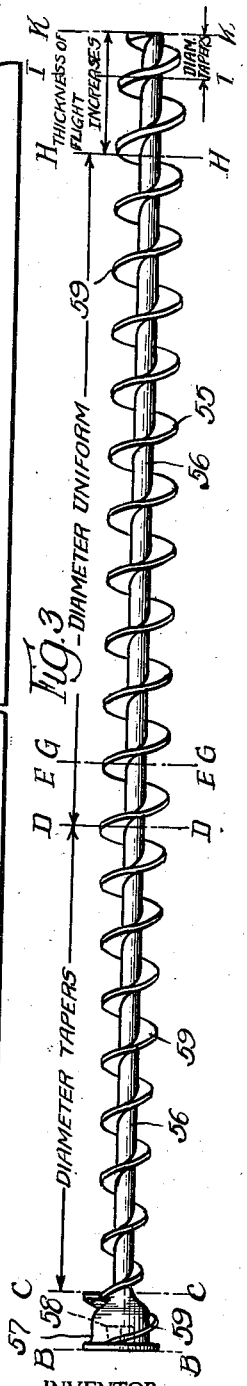
INVENTOR
Walter P. Smith,
C. Edward Westover,
BY Nov. 25, 1941. W. P. SMITH ET AL 2,264,222
MEANS FOR MOLDING
Filed April 4, 1941 3 Sheets-Sheet 3
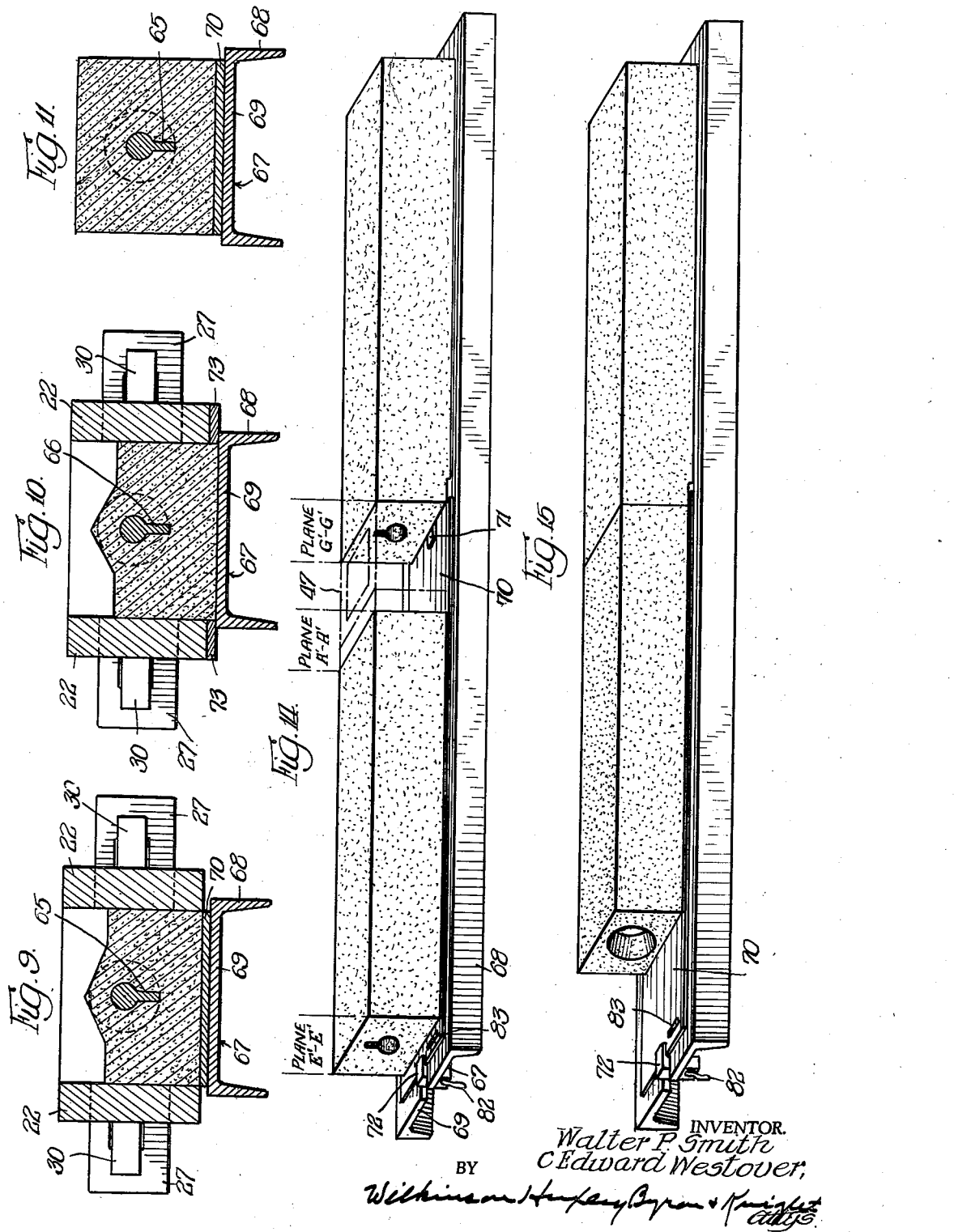
INVENTOR.
Walter P. Smith
C. Edward Westover Patented Nov. 25, 1941

2,264,222

UNITED STATES PATENT OFFICE 2,264,222

MEANS FOR MOLDING

Walter P. Smith and C Edward Westover, Chicago, Ill., assignors to Burnside Steel Foundry Company, Chicago, Ill., a corporation of Illinois Application April 4, 1941, Serial No. 386,828

15 Claims. (Cl. 22—14)

The present invention relates to improvements in means for molding.

More particularly the present invention relates to improvements in means for molding articles of irregular shape, such for example as a screw-threaded member which varies in pitch and flight contour intermediate of its ends whereby to present difficulties in the commonly used means and methods for molding.

It has been common practice in preparing molds for threaded members to provide patterns having screw-threads corresponding to the desired mold cavity or cavities and to remove the threaded pattern or patterns with a screwing action. The means and methods as heretofore known and used have presented very serious limitations upon the screws which could be produced and/or upon the speed with which production could be accomplished.

An object of the present invention is to provide improved means for forming a threaded mold cavity of varying pitch and flight contour.

A further object is to provide an improved flask for molding a threaded mold cavity of varying pitch and flight contour wherein the mold for a complete threaded screw member may be rammed up in a single ramming operation.

A further object is to provide improved pattern means for use in forming the mold for a screw-threaded member of varying flight contour which pattern is simple in use and effective in operation.

Further objects will appear as the description proceeds.

Referring to the drawings—

Figure 1 is a top plan view of a flask having pattern members and certain core print members cooperatively associated therewith, which members embody the principles of the present invention;

Figure 2 is a side view of the structure of Figure 1 but having a bottom member located upon the upper side of the flask, Figure 2 representing the parts as they are positioned midway of the operation of forming a mold;

Figure 2a is a sectional view taken along the plane 2a—2a of Figure 1;

Figure 3 is a side view of an elongated screw-threaded member which may be a screw conveyor for a stoker or the like, which screw-threaded member is provided at one of its ends with a socket member having at its periphery a thread of relatively large diameter, said elongated screw-threaded member adjacent to said socket member having a threaded tapered portion starting with a diameter considerably less than the thread upon said socket member and increasing in diameter up to a maximum, followed by a portion of uniform diameter of flight of greater pitch than that of said tapered portion, said portion of uniform diameter of flight including a portion in which the thickness of the flight increases progressively, said elongated screw-threaded member having an end portion opposite to its first-mentioned end decreasing in diameter toward the adjacent extremity of the threaded member; said Figure 3 being chosen merely as one exemplification of the type of threaded member adapted to be molded according to the principles of the present invention;

Figure 4 is an enlarged cross-sectional view taken along the plane indicated by the arrows 4—4 of Figure 2;

Figure 5 is an enlarged sectional view taken along the plane indicated by the arrows 5—5 of Figure 2;

Figure 6 is a perspective view of an end block such as shown at the left-hand ends of Figures 1 and 2;

Figure 7 is a perspective of a center block and a cooperating core print such as illustrated in the mid portion of Figure 1;

Figure 8 is a perspective view of an end block together with a core print as shown at the right-hand end of Figure 1;

Figure 9 is a view similar to Figure 4 but with the flask turned upside down and the follow board removed, the flask being ready for the completion of the ramming operation;

Figure 10 is a view similar to Figure 5 but with the flask turned upside down and the follow board removed, the flask being ready for the completion of the ramming operation;

Figure 11 is a view similar to Figure 9 but with the flask removed and with the left-hand mold ready to be turned end for end;

Figure 12 is a fragmentary view of a bottom member forming part of the structure illustrated in the preceding figures and illustrating particularly a reversing plate forming a part of the present invention;

Figure 13 is a sectional view taken along the plane indicated by the arrows 13—13 of Figure 12;

Figure 14 is a perspective view showing the left-hand and right-hand molds with the flask removed, the left-hand mold being ready to be turned end for end; and Figure 15 is a perspective view illustrating a completed composite mold ready for the insertion of end cores and the provision of the usual means for pouring.

The numeral 20 indicates a follow board, which is an elongated member. Said follow board has part of its upper surface in the form of a trough provided with the metal liner means 21. Adapted to rest upon said follow board 20 are the side walls 22—22 of a flask, which are adapted to be held in spaced parallel relationship with each other by means of the end blocks 23 and 24.

Said end block 23, which is disposed adjacent to the left-hand extremity of the flask as the parts are viewed in Figures 1 and 2 includes a mid portion 25 (see Fig. 6) having the side surfaces 26—26 adapted to abut against the inner surfaces of the side walls 22—22. Extending from said mid portion 25 are the end portions 27—27 adapted to project through corresponding apertures in said side walls 22—22. Said end portions are provided with the holes 29—29 for receiving wedges 30—30 adapted to be disposed in position to exert pressure against the outer surfaces of the side walls 22—22 to hold releasably the end block 23 in rigid relationship with the adjacent ends of the side walls 22—22.

The upper surface of the mid portion 25 of the end block 23 is provided with the plate 31 having a flat surface 32 adapted to receive an extremity of a reversing plate, to be described presently. Adjacent to the flat surface 32 is a shouldered portion 33 adapted to abut against said reversing plate, as will presently appear. Said shouldered portion 33 is provided with a recess 34 to receive a latching member, to be described presently. The right-hand face of the mid portion 25 of the end block 23, as the parts are viewed in Figure 6, is provided with a facing member 35, which may be of metal. Said facing member 35 is provided with an aperture 36 corresponding to the shank of a pattern for a screw conveyor or the like. Communicating with the aperture 36 is a spiral slot 37 corresponding to the flight of a screw-threaded pattern. Said end block 23 with its facing member 35 comprises a stripper block whereby a pattern may be screwed outwardly from the sand within the flask without disturbing such sand.

Referring now to the end block 24 illustrated in perspective in Figure 8, said end block includes the mid portion 38 having the side surfaces 39—39 adapted to abut against the inner surfaces of the side members 22—22. Extending from the mid portion 38 are the end portions 40—40 each provided with an aperture 41 for the reception of a wedge member 42 (Figs. 1 and 2).

Secured to the left-hand face of the mid portion 38 of the end block 24 is the plate 43 adapted to hold the longitudinally extending core print 44. Said core print 44 has the annular shoulder 45a located in a corresponding recess in one side of the plate 43. Screw bolts 45b—45b are adapted to hold the plate 43 in clamping relationship with the annular shoulder 45a whereby the core print 44 may be secured in circumferentially adjusted position. Shims 45c—45c may be used for adjusting the axial position of the core print 44. Said core print 44 is provided with the longitudinally extending aperture 45 for receiving the shank of a screw-threaded pattern. Communicating with the aperture 45 is the spiral slot 46 for receiving the flight of a screw-threaded pattern. The end block 24, including the core print 44, forms a stripper block whereby a screw-threaded pattern may be screwed outwardly from the sand within the flask without disturbing said sand.

Disposed intermediate of the length of the flask is the center block 47 which may be provided with dowels 48, or other means, for definitely locating said center block with reference to the side members 22—22. Said center block is adapted to rest upon the follow board 20. Said center block 47 includes the hollow rectangular portion 49. Carried on one of the faces of the rectangular portion 49 of the center block 47 is the plate 50, apertured to receive the longitudinally extending core print 51. Said core print 51 includes the outwardly extending end portion 52 adapted to be encircled by the retractable screw flight 53. Said retractable screw flight 53 may be manipulated by means of the handle 54 located interiorly of the rectangular portion 49. Said core print 51 has the annular shoulder 51a located in a corresponding recess in one side of the plate 50. Screw bolts 51b—51b are adapted to hold the plate 50 in clamping relationship with the annular shoulder 51a whereby the core print 51 may be secured in circumferentially adjusted position. Shims 51c—51c may be used for adjusting the axial position of the core print 51.

The handle 54 for manipulating the retractable screw flight 53 may be releasably latched against accidental turning by the resiliently controlled pin 54a adapted to fit into a corresponding recess in the center block 47.

The numeral 54b indicates a holding bar located intermediate of the length of the side members 22—22. Said bar has a shoulder 54c adapted to engage the outer side of one of said members 22 and a shank 54d adapted to extend through apertures in the mid region of said side members 22—22 as well as apertures in the portion 49 of the center block 47. A wedge 54e serves to secure the holding bar 54b in position.

Figure 3 illustrates a screw member which may be molded expeditiously by the practice of the present invention. Said screw member is indicated by the numeral 55 and includes the shank 56. The left-hand end of the screw member 55 is provided with a socket portion 57 having a non-round recess 58 for the reception of a correspondingly shaped member for communicating turning movement to said screw member 55. Surrounding the socket portion 57 and extending to the right-hand end of the member 55 is the screw flight 59.

A description of the screw-threaded member 55 will be given in connection with a description of the pattern members for forming the mold for casting said screw member 55.

For the purpose of forming the mold for casting the screw member 55, two screw-threaded pattern members 65 and 66 are provided.

The plane A'—A' (Fig. 1) defines the left-hand surface of the plate 50 forming part of the center block 47. The plane B'—B' (Fig. 1) defines the juncture of the end portion 52 with the remainder of the core print 51. Said plane B'—B' corresponds to the plane B—B (Fig. 3) of the resulting screw member. The plane C'—C' (Fig. 1) defines the left-hand extremity of the retractable screw flight 53. Said plane C'—C' corresponds to the plane C—C of Figure 3. Said retractable screw flight 53 is adapted to form the mold cavity for that portion of the screw flight 59 (Fig. 3) encircling the socket portion 57. The portion of the screw flight 59 between the plane B—B and the plane C—C is of relatively large diameter compared with that portion of the screw flight 59 immediately to the right of the plane C—C (Fig. 3), and the pitch of the screw flight 59 between the planes B—B and C—C (Fig. 3) may differ from the pitch of that portion of the flight 59 immediately to the right of the plane C—C (Fig. 3).

The flight 59 may increase in diameter from the plane C—C (Fig. 3) toward the right to the plane D—D, where the diameter of the screw flight 59 may reach its maximums. Said plane D—D of Figure 3 corresponds to the plane D'—D' of Figure 1.

The diameter of the screw flight 59 may be uniform for a distance from the plane D—D toward the right (Fig. 3). Referring to Figure 1, the plane E'—E' defines the right-hand surface of the left-hand end block 23. In other words, the plane E'—E' coincides with the surface presented toward the observer of the plate 35 illustrated in Figure 6. The surface referred to defines the left-hand extremity of the mold to be formed in the left-hand portion of the flask as the parts are viewed in Figure 1. The plane E'—E' (Fig. 1) corresponds to the plane E—E of Figure 3. It will be understood, of course, that the pattern member 65 may extend for a considerable distance beyond the end block 23, whereby said pattern member, in combination with other lengths of flask, may be used for forming the mold cavities of screws of varying lengths.

The screw flight of screw pattern 66 has its left-hand extremity (Fig. 1) abutting against the right-hand surface of the rectangular portion 49 of the center block 47. The extremity 66a of the pattern 66 fits within a corresponding cylindrical hole in the member 49. This surface corresponds with the plane G'—G' (Fig. 1) and with the plane G—G of Figure 3. The screw flight of the pattern 66 may be of uniform diameter from the plane G'—G' to the plane H'—H' (Fig. 1), which corresponds with the plane H—H of Figure 3. The part of the screw flight 59 of the screw member 55 (Fig. 3) between the planes H—H and I—I has a thickness greater than that part of the flight between the planes G—G and H—H. As illustrated, the thickness of flight of the portion of the screw member 55 increases progressively from the plane H—H to the plane K—K (Fig. 3). That portion of the screw flight 59 from the plane I—I to the plane K—K decreases in diameter. The plane I—I of Figure 3 corresponds to the plane I'—I' of Figure 1. This plane I'—I' marks the left-hand surface of the right-hand core print 44 (Figs. 1 and 8). The plane J'—J' marks the end of the screw flight of the pattern member 66 (Fig. 1). By reason of the extension of the pattern member 66 beyond the plane I'—I', the pattern member 66 may be used in combination with other lengths of flask for forming a mold cavity for screws of differing lengths. The mold cavity for the tapered extremity from the plane I—I to the plane K—K of Figure 3 will be provided by a core (not illustrated) to be inserted within the mold cavity formed by the core print 44.

As will be explained presently, the plane E—E in Figure 3 is identical with the plane G—G.

As above indicated, the practice of the present invention involves the turning end for end of the mold made by the pattern member 65, so that the end of said mold marked by the plane E'—E' will be brought into coincidence with the left-hand end of the mold at the right-hand end of the flask, the left-hand face of which is indicated by the plane G'—G'. In other words, the practice of the present invention involves the turning of the mold formed by the pattern 65 end for end to bring the plane E'—E' into coincidence with the plane G'—G' to the end that the mold cavity at the plane E'—E' will match up with the mold cavity at the plane G'—G'. For this purpose the position of the end block 23 will be so chosen with respect to the position of the center block 47 that the mold cavity at the plane E'—E' will correspond in location and contour to the mold cavity at the plane G'—G'.

The means for conveniently turning the left-hand mold end for end will now be described.

The numeral 67 indicates a bottom member which includes a channel 68 having the web 69. Carried by the web 69 of the channel 68 is the reversing plate 70. The ends of said reversing plate 70 are provided with grooved recesses, one adapted to be overlaid and interfitted by a tongue 71 secured to the web 69 of the channel 68. The recessed portion at the other extremity of the reversing plate 70 is adapted to be overlaid and interfitted by a spring-controlled latching member or clip 72. Said tongue 71 and said latching member 72 are adapted to hold the reversing plate 70 releasably in predetermined relationship with respect to the channel 68, whereby said reversing plate 70 will be accurately positioned in parallel relationship with said channel 68 whether or not said reversing plate 70 is in one or the other of its two alternative end for end positions. For this purpose it is preferred to position the tongue 71, the latching member 72 and the recesses at the two ends of the reversing plate 70 in symmetrical relationship with the longitudinal axis of the reversing plate 70, or, in other words, in the plane disposed symmetrically with reference to the side members 22—22 midway between said side members.

Said reversing plate 70 extends from a region adjacent to the left-hand end of the channel 68 as the parts are viewed in Figures 1, 2, 14 and 15 to a mid region of the length of said channel 68. Said reversing plate 70 in the illustrated embodiment of the present invention extends to a region a short distance to the right of the right-hand extremity of the center block 47, that is— to a plane marked approximately by the line L'—L'. Said reversing plate 70 has a width corresponding approximately to the distance between the side members 22—22.

The width of the channel 68 is greater than the distance between the side members 22—22, and in order to provide parallelism between the channel 68 and the plane marking the bottoms of the side members, the top surfaces of said side members 22—22 are provided with the spacers 73—73 extending from approximately the plane L'—L' to the right-hand extremities of the side members 22—22 as the parts are viewed in Figure 1. Said spacers 73—73 will have approximately the same thickness as the reversing plate 70. Adjacent to the right-hand extremity of the flask as the parts are viewed in Figure 1, the spacers 73—73 are provided with locating means 74—74 adapted to locate the channel 68 in parallelism with the axis of the flask. The top surfaces of the side members 22—22 are also provided with the locating means 75—75 and 76—76 adapted to engage the side edges of the reversing plate 70 to definitely locate said reversing plate 70 with respect to the side members 22—22.

As indicated hereinabove, the reversing plate 70 is reversed end for end in the practice of the present invention, the tongue 71 and the latching member 72, fitting into recesses in the end of the reversing member 70, serving to hold said reversing plate 70 accurately in position with respect to the channel 68 in either alternative end for end position of said reversing plate 70. The latching member 72 is resiliently mounted in the left-hand end of the channel 68 as the parts are viewed in Figures 12 and 13, said latching member having a reciprocatory motion in a slot 77 in the web of the channel 68. Said latching member has attached thereto the reciprocable rod 78 adapted to ride in a boss 79 fast with respect to the web of the channel 68. Said rod has the head 80 at one extremity thereof, and a spring 81 located between the boss 79 and the head 80 serves to resiliently urge the latching member 72 toward the right as the parts are viewed in Figures 12 and 13. A handle 82 is provided for manipulating the latching member 72. Notches 83—83 may be provided in the upper surface of the reversing plate 70 adjacent to the extremities thereof, whereby to facilitate the gripping thereof when said plate 70 is to be reversed end for end.

The method of carrying out the present invention and the mode of operation of the construction illustrated and described are substantially as follows:

The follow board 20 will be positioned approximately horizontally and the side members 22—22 will have their side edges resting upon said follow board. The center block 47 will rest upon the follow board and will be positioned longitudinally of the flask by the dowels 48—48 or equivalent locating means. The pattern members 65 and 66 will be disposed upon the liner means 21 forming part of the follow board 20, means (not illustrated) being provided to hold the patterns 65 and 66 in axial alignment. The pattern member 65 will have threaded engagement with the end block 23, and the retractable screw-thread 53 will be screwed out to the left to engage with the right-hand extremity of the screw flight of the pattern member 65 along the plane indicated by the letters C'—C' of Figure 1. The pattern member 66 will have its cylindrical extremity 66a positioned in the corresponding cylindrical hole in the center block 47. Said pattern member 66 will have screw-threaded engagement with the right-hand end block 24.

The present invention contemplates means for providing adjustments in the lengths of the mold sections to compensate for temperature variations and variations due to other causes. Referring to the end block 24, said end block is provided with the shims 45c—45c for adjusting the position lengthwise of the flask of the plate 43. Inasmuch as the core print 44 has threaded engagement with the pattern 66, longitudinal adjustment of the plate 43 will require circumferential adjustment of the core print 44. Such adjustment is provided for the clamping relationship between the plate 43 and the annular shoulder 45a of the core print 44. The screw bolts 45b—45b may be loosened to permit circumferential adjustment of the core print 44, after which said screw bolts may be again tightened up.

Likewise, the center block 47 is provided with shims 51c—51c for permitting longitudinal adjustment of the plate 50. Such longitudinal adjustment of the plate 50 will require circumferential adjustment of the core print 51. Such circumferential adjustment is provided for by reason of the clamping relationship between the plate 50 and the annular shoulder 51a of the core print 51. The screw bolts 51b—51b may be loosened to permit such circumferential adjustment, after which such screw bolts may be again tightened up. By reason of the circumferential adjustment of the core print 51, assurance may be had that the retractable screw flight 53 may be brought into coincidence with the adjacent terminus of the screw flight on the pattern member 65.

The parts will preferably be so proportioned that the holding bar 54b may not be inserted into the side members 22—22 and the center block 47 until the handle 54 has been turned to move the retractable screw flight 53 out to the left to its operative position as the parts are viewed in Figure 1. In other words, it is not possible to insert the holding bar 54b until the handle 54 has been turned to properly position the retractable screw flight 53. By reason of the latching member 54a the handle 54 and consequently the retractable screw flight 53 will be held against turning movement while the flask is being rammed up with sand.

With the parts thus disposed, sand will be rammed around the patterns and core prints, which sand will be struck off at the level of the tops of the side members 22—22 at the region thereof to the left of the plane L'—L' (Fig. 1) and will be struck off to the level of the upper surfaces of the spacers 73—73 at the region to the right of the plane L'—L' (Fig. 1). The bottom member (which includes the channel 68 and the reversing plate 70) will then be placed in position upon the side members 22—22, the reversing plate being lowermost, the left end of the reversing plate 70 abutting against the shouldered portion 33 of the end block 23 (Fig. 6). The recess 34 of said portion 33 is adapted to receive the latching member or clip 72. The parts are then in the position illustrated in Figures 4 and 5. The entire assembly will then be rolled over through an angle of 180 degrees about the longitudinal axis of the flask into the position illustrated in Figures 9 and 10. The follow board 20 will then be removed and the remainder of the space between the side members 22—22 will be rammed up with sand, which sand may be struck off at the level now uppermost of the side members 22—22.

After the flask has been rammed with sand, the wedges 30—30 at the left-hand end of the flask, the wedges 42—42 at the right-hand end of the flask, and the wedge 54e at the middle thereof (Fig. 1) will be removed, after which the holding bar 54b and the side members 22—22 may be withdrawn and the end blocks 23 and 24 may be removed, leaving the center block 47, the right-hand mold and the left-hand mold disposed upon the bottom member 67.

The operator will now pull toward the left upon the handle 82 whereby to free the latching member 72 from the reversing plate 70. He may swing the handle 82 through an arc whereby to position the latching member 72 out of obstructing relationship with the reversing plate 70. The operator may pull the reversing plate toward the left as the parts are viewed in Figure 14, freeing the right-hand extremity of the reversing plate from the tongue 71 and also freeing the center block 47 from the left-hand extremity of the right-hand mold as the parts are viewed in Figures 1 and 14. After making sure that the retractable screw flight 53 has been withdrawn from the left-hand mold, the operator may remove the center block, with its core print 51, from the left-hand mold.

The operator may then swing the reversing plate 70 end for end, whereby that extremity of the left-hand mold marked by the plane E'—E' will be brought into coincidence with the end of the right-hand mold, marked by the plane G'—G'. The mold cavity at the plane E'—E' will coincide with the mold cavity in the left-hand end of the right-hand mold. The recess in one extremity of the reversing plate 70 will interfit with the tongue 71, and the recess at the other extremity will interfit with the latching member 72, whereby accuracy of position of the left-hand mold is assured.

A core will be positioned in the mold cavity formed by the core print 44 to provide the mold cavity for the part of the screw member 55 from plane I—I to plane K—K, and another core will be positioned in the mold cavity formed by the core print 51 to provide a mold for the socket 58. These two cores (not illustrated) may, according to well known practice, be provided with the usual gates, whereby pouring may be accomplished.

Though a preferred embodiment of the present invention has been described in detail, many modifications will occur to those skilled in the art. It is intended to cover all such modifications that fall within the scope of the appended claims.

What is claimed is:

1. Molding means comprising, in combination, a flask including removable side walls, a center block having a core print on one of its sides adapted to be disposed intermediate of the length of said flask, a tapering screw-threaded pattern member disposed in said flask with its smaller extremity adjacent to said core print and another pattern member adapted to be disposed in said flask on the other side of said center block, said last mentioned pattern member having screw flights of varying dimensions, the lesser of said dimensions being disposed adjacent to said center block.

2. Molding means comprising, in combination, a flask including removable side walls, a center block having a core print on one of its sides adapted to be disposed intermediate of the length of said flask, a tapering screw-threaded pattern member disposed in said flask with its smaller extremity adjacent to said core print and another pattern member adapted to be disposed in said flask on the other side of said center block, said last mentioned pattern member having screw flights of varying dimensions, the lesser of said dimensions being disposed adjacent to said center block, said core print being interiorly screw-threaded, and means for adjusting the position of said core print along the axis of its threaded portion and circumferentially with respect to said axis.

3. Molding means comprising, in combination, a flask including removable side walls, a center block having a core print on one of its sides adapted to be disposed intermediate of the length of said flask, a tapering screw-threaded pattern member disposed in said flask with its smaller extremity adjacent to said core print, and another pattern member adapted to be disposed in said flask on the other side of said center block, said last mentioned pattern member having screw flights of varying dimensions, the lesser of said dimensions being disposed adjacent to said center block, said core print being provided with a screw flight retractable into said center block.

4. Molding means comprising, in combination, a flask including removable side walls, a center block having a core print on one of its sides adapted to be disposed intermediate of the length of said flask, a tapering screw-threaded pattern member disposed in said flask with its smaller extremity adjacent to said core print and another pattern member adapted to be disposed in said flask on the other side of said center block, said last mentioned pattern member having screw flights of varying dimensions, the lesser of said dimensions being disposed adjacent to said center block, said core print being interiorly screw-threaded, and means for adjusting the position of said core print along the axis of its threaded portion and circumferentially with respect to said axis, said core print being provided with a screw flight retractable into said center block.

5. Molding means comprising, in combination, a flask including removable side walls, a center block having a core print on one of its sides adapted to be disposed intermediate of the length of said flask, a tapering screw-threaded pattern member disposed in said flask with its smaller extremity adjacent to said core print, and another pattern member adapted to be disposed in said flask on the other side of said center block, said last mentioned pattern member having screw flights of varying dimensions, the lesser of said dimensions being disposed adjacent to said center block, said center block at said other side being shaped to receive and locate the adjacent extremity of said last mentioned pattern member.

6. Molding means comprising, in combination, a flask including removable side walls, a center block having a core print on one of its sides adapted to be disposed intermediate of the length of said flask, a tapering screw-threaded pattern member disposed in said flask with its smaller extremity adjacent to said core print, another pattern member adapted to be disposed in said flask on the other side of said center block, said last mentioned pattern member having screw flights of varying dimensions, the lesser of said dimensions being disposed adjacent to said center block, said core print being provided with a screw flight retractable into said center block, and removable holding means for said side walls extending through said center block in position to obstruct the retracting of said retractable screw flight.

7. Molding means comprising, in combination, a flask including removable side walls, a center block adapted to be disposed intermediate of the length of said flask, a tapering screw-threaded pattern member disposed in said flask with its smaller extremity adjacent to said center block, another pattern member adapted to be disposed in said flask on the other side of said center block, said last mentioned pattern member having screw flights of varying dimensions, the lesser of said dimensions being disposed adjacent to said center block, and end blocks for said flask adapted to hold said side members in predetermined positions and providing stripping means for said pattern members.

8. Molding means comprising, in combination, a flask including removable side walls, a center block adapted to be disposed intermediate of the length of said flask, a tapering screw-threaded pattern member disposed in said flask with its smaller extremity adjacent to said center block and another pattern member adapted to be disposed in said flask on the other side of said center block, said last mentioned pattern member having screw flights of varying dimensions, the lesser of said dimensions being disposed adjacent to said center block, said flask being provided with a follow board adapted to be placed upon one side thereof in bridging relationship with said side members, and a bottom plate adapted to be positioned upon the other side of said flask in bridging relationship with said side members, said bottom plate being provided with a reversing plate, which reversing plate is adapted to be reversed end for end with respect to the remainder of said bottom member.

9. Molding means comprising, in combination, a flask including removable side walls, a center block adapted to be disposed intermediate of the length of said flask, a tapering screw-threaded pattern member disposed in said flask with its smaller extremity adjacent to said center block and another pattern member adapted to be disposed in said flask on the other side of said core print, said last mentioned pattern member having screw flights of varying dimensions, the lesser of said dimensions being disposed adjacent to said center block, said flask being provided with a follow board adapted to be placed upon one side thereof in bridging relationship with said side members, and a bottom plate adapted to be positioned upon the other side of said flask in bridging relationship with said side members, said bottom plate being provided with a reversing plate, which reversing plate is adapted to be reversed end for end with respect to the remainder of said bottom member, said reversing plate and the remainder of said bottom member being provided with cooperating holding means for insuring alignment of said reversing plate with the remainder of said bottom plate regardless of which extremity of said reversing plate is positioned adjacent to an end of the remainder of said bottom member.

10. Molding means comprising, in combination, a follow board, removable side members and a bottom plate, end blocks for holding said side members in predetermined relationship with each other, said end blocks having stripper means cooperatively associated therewith, a center block having a core print on one side thereof adapted to be positioned intermediate of the length of said flask, a threaded pattern member having a screw flight of progressively varying dimensions, the smallest dimension thereof being adapted to be positioned adjacent to said core print, and a second threaded pattern member having a screw flight of progressively varying dimensions, the smallest of said dimensions being located adjacent to said center block, the screw flight of said last mentioned pattern member being adapted to be positioned against a side of said center block to form a mold cavity at a predetermined region, the end block at the opposite extremity of said flask engaging the screw flight of said first mentioned pattern member at a region located symmetrically with respect to said mold cavity formed at the junction of said second mentioned pattern member and said center block.

11. In molding means, in combination, a flask including a follow board, side walls and end blocks, a center block having a core print on one side thereof disposed intermediate of the length of said flask, a first screw-threaded pattern member mounted within said flask, said first screw-threaded pattern member having a tapering screw flight, the smallest dimension of which is disposed adjacent to said core print, said core print having cooperatively associated therewith a retractable screw flight of larger diameter than the smallest diameter of said first mentioned screw flight and adapted to be brought into coincidence with a terminal of said first mentioned screw flight, said retractable screw flight being retractable into said center block, and a second screw-threaded pattern member adapted to engage said core print upon the other side from said first mentioned screw-threaded pattern member, said second screw-threaded pattern member having a screw flight of progressively varying dimensions, the smallest of said dimensions being disposed adjacent to said center block.

12. In molding means, in combination, a flask including a follow board, side walls and end blocks, a center block having a core print on one side thereof disposed intermediate of the length of said flask, a first screw-threaded pattern member mounted within said flask, said first screw-threaded pattern member having a tapering screw flight, the smallest dimension of which is disposed adjacent to said core print, said core print having cooperatively associated therewith a retractable screw flight of larger diameter than the smallest diameter of said first mentioned screw flight and adapted to be brought into coincidence with a terminal of said first mentioned screw flight, said retractable screw flight being retractable into said center block, and a second screw-threaded pattern member adapted to engage said center block upon the other side from said first mentioned screw-threaded pattern member, said second screw-threaded pattern member having a screw flight of progressively varying dimensions, the smallest of said dimensions being disposed adjacent to said center block, said end blocks comprising stripper means for facilitating the removal of said screw-threaded pattern members from molds within said flask.

13. In molding means, in combination, a follow board and movable side walls, a center block disposed intermediate of the length of said side walls, said center block having a hollow interior, said center block being formed at one side thereof with means for locating the extremity of a pattern member and having a core print with a retractable screw flight at the opposite side thereof, and means for retracting said screw flight into the interior of said center block with a helical movement.

14. In molding apparatus, in combination, a bottom member adapted to be associated with a flask, said bottom member comprising a flat portion and a reversing plate, said reversing plate being adapted to lie upon said flat portion, said flat portion and said reversing plate having releasable holding means for holding said reversing plate in either of two alternative end for end positions of said reversing plate.

15. In molding apparatus, in combination, a flask, a follow board adapted to be located upon one side of said flask, and a bottom member adapted to be located on the opposite side of said flask, said bottom member including a flat portion and a reversing plate, said flat portion and said reversing plate having releasable holding means disposed symmetrically of the length of said flask and said reversing member for releasably holding said reversing plate in predetermined relationship with said flat portion in either of two alternative end for end positions of said reversing plate.

WALTER P. SMITH.
C. EDWARD WESTOVER.